US012311210B1

(12) United States Patent
Sekula

(10) Patent No.: US 12,311,210 B1
(45) **Date of Patent: *May 27, 2025**

(54) FAST RESPONSE GLASS BULB THERMAL TRIGGER ARRANGEMENTS AND METHODS THEREOF FOR LARGE ORIFICE SUPPRESSION FIRE PROTECTION SPRINKLERS

(71) Applicant: Minimax Viking Patent Management GmbH, Bad Oldesloe (DE)

(72) Inventor: Stefan Daniel Sekula, Holt, MI (US)

(73) Assignee: Minimax Viking Patent Management GmbH, Bad Oldesloe (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/636,460

(22) Filed: Apr. 16, 2024

Related U.S. Application Data

(63) Continuation of application No. 17/982,977, filed on Nov. 8, 2022, now Pat. No. 11,986,691, which is a continuation of application No. 16/905,139, filed on Jun. 18, 2020, now Pat. No. 11,511,145.

(60) Provisional application No. 62/863,513, filed on Jun. 19, 2019.

(51) Int. Cl.
*A62C 37/12* (2006.01)
*A62C 37/50* (2006.01)

(52) U.S. Cl.
CPC .............. *A62C 37/12* (2013.01); *A62C 37/50* (2013.01)

(58) Field of Classification Search
CPC ................................ A62C 37/12; A62C 37/50
See application file for complete search history.

(56) References Cited

U.S. PATENT DOCUMENTS

| | | | | |
|---|---|---|---|---|
| 4,167,974 | A * | 9/1979 | Job | A62C 37/14 169/38 |
| 4,796,710 | A * | 1/1989 | Job | A62C 37/14 169/37 |
| 4,938,294 | A * | 7/1990 | Mohler | A62C 37/14 169/37 |
| 7,730,959 | B2 * | 6/2010 | Fischer | A62C 31/02 169/37 |
| 8,122,969 | B1 * | 2/2012 | Fischer | A62C 37/08 169/37 |
| 8,973,669 | B2 * | 3/2015 | Connery | A62C 37/14 169/17 |
| 9,474,920 | B1 * | 10/2016 | Fewel | A62C 35/023 |
| 9,717,936 | B2 * | 8/2017 | Ancone | A62C 35/68 |
| 10,046,191 | B1 * | 8/2018 | Hernandez | C09K 5/20 |
| 10,661,107 | B2 * | 5/2020 | Workman | A62C 37/11 |
| 10,940,496 | B2 * | 3/2021 | Silva, Jr. | A62C 31/02 |

(Continued)

FOREIGN PATENT DOCUMENTS

DE 10 2004 027 568 12/2005

OTHER PUBLICATIONS

Job GmbH, Job Thermo Bulbs, Technical Specification, Job ® F 3×27, Drawing 22260 Spec No. 22376, Jan. 2018, 2 pages.

(Continued)

*Primary Examiner* — Joseph A Greenlund
(74) *Attorney, Agent, or Firm* — Perkins Coie LLP

(57) ABSTRACT

Fire protection sprinkler assemblies and methods thereof having thermally responsive glass bulb trigger arrangements for suppression mode fast response fire protection in which the glass bulb trigger arrangements provide a consistent thermal response.

8 Claims, 4 Drawing Sheets

(56) References Cited

U.S. PATENT DOCUMENTS

| | | | | |
|---|---|---|---|---|
| 11,033,764 | B2 * | 6/2021 | Magnone | A62C 3/002 |
| 11,065,487 | B2 * | 7/2021 | Miller | A62C 35/62 |
| 11,511,145 | B1 * | 11/2022 | Sekula | A62C 37/12 |
| 11,786,767 | B2 * | 10/2023 | Multer | A62C 3/06<br>169/46 |
| 2003/0079889 | A1 * | 5/2003 | Meyer | A62C 37/11<br>169/41 |
| 2006/0060361 | A1 * | 3/2006 | Pounder | A62C 37/14<br>169/37 |
| 2006/0289174 | A1 * | 12/2006 | Yu | A62C 35/58<br>169/37 |
| 2008/0319716 | A1 * | 12/2008 | Golinveaux | A62C 35/60<br>703/1 |
| 2009/0126950 | A1 * | 5/2009 | Rogers | A62C 37/09<br>169/37 |
| 2015/0027739 | A1 * | 1/2015 | Multer | A62C 35/68<br>169/37 |
| 2015/0165252 | A1 * | 6/2015 | Koppe | A62C 37/08<br>169/37 |
| 2018/0015315 | A1 * | 1/2018 | Cutting | H02G 3/0412 |
| 2018/0071562 | A1 * | 3/2018 | Wancho | A62C 31/02 |
| 2019/0143162 | A1 * | 5/2019 | Silva, Jr. | A62C 37/08<br>169/70 |
| 2019/0184411 | A1 * | 6/2019 | Silva, Jr. | B05B 1/267 |
| 2021/0205648 | A1 * | 7/2021 | Thompson | A62C 37/12 |
| 2021/0260608 | A1 * | 8/2021 | Silva, Jr. | A62C 37/14 |
| 2021/0370113 | A1 * | 12/2021 | Franson | A62C 35/68 |
| 2022/0219032 | A1 * | 7/2022 | Sahai | G05B 15/02 |

OTHER PUBLICATIONS

Tyco Fire Products LP, Technical Datasheet, Model ESFR-14 14.0 K-factor Pendent Sprinklers Early Suppression, Fast Response, Aug. 2018, TFP319, 4 pages.

Victaulic Company, FireLock® V48, K25.2 Model V4802 Early Suppression Fast Response (ESFR), 40.91, 12089 Rev E, Mar. 2019, 6 pages.

The Viking Corporation, Technical Data, Standard Response Upright Sprinkler VK598 (K25.2), Form No. F_090414, 18.11.01, Rev 17.1. P65, 6 pages.

Underwriters Laboratories Inc., UL 1767 Standard for Safety Early-Suppression Fast-Response Sprinklers, Leakage Test (pp. 19-23) Fourth Edition, Apr. 30, 2013 (revised through Oct. 29, 2015), 6 pages.

FM Approval LLC, Approval Standard for Quick Response Storage Sprinklers for Fire Protection, Class No. 2008, Sections 4.6-4.9, Feb. 2018, 3 pages.

Victaulic Company, FireLock® V47, K16.8 Model V4702 Early Suppression Fast Response (ESFR) 40.89, 10090 Rev C, Updated Apr. 2018, 5 pages.

FM Approval LLC Approval Standard for Water Mist Systems, Nov. 2012, 2012.

* cited by examiner

FAST RESPONSE GLASS BULB THERMAL TRIGGER ARRANGEMENTS AND METHODS THEREOF FOR LARGE ORIFICE SUPPRESSION FIRE PROTECTION SPRINKLERS

PRIORITY CLAIM & INCORPORATION BY REFERENCE

This application is a continuation of U.S. patent application Ser. No. 17/982,977, filed Nov. 8, 2022, which is a continuation of U.S. patent application Ser. No. 16/905,139, filed Jun. 18, 2020, now U.S. Pat. No. 11,511,145, granted Nov. 29, 2022, which claims the benefit of U.S. Provisional Application No. 62/863,513 filed Jun. 19, 2019, all of which applications are incorporated by reference in their entirety.

TECHNICAL FIELD

The present invention generally relates to automatic fire protection sprinklers that use glass bulb trigger assemblies. In particular, the present invention is directed to suppression mode sprinklers having a glass bulb trigger in an arrangement that consistently provides a thermal response for its intended purpose.

BACKGROUND ART

Generally, automatic fire protection sprinklers discharge a firefighting fluid in a controlled manner to impact some type of fluid deflector to distribute the fluid in a defined spray distribution pattern over an area to address a fire. Fluid discharge is controlled by a configuration of components that include a sprinkler body and thermally responsive actuator or trigger that maintains a fluid tight seal at the discharge orifice of the body by means such as the exertion of pressure on a cap (button or disc) or other sealing assembly that seals the discharge orifice. The thermal operation of the trigger is defined by its nominal temperature rating measured in degrees Fahrenheit (Celsius) and its thermal sensitivity measured or characterized by its operational Response Time Index ("RTI") in units of $(ft \cdot s)^{1/2}$ $[(m \cdot s)^{1/2}]$. When the temperature surrounding a sprinkler is elevated to the nominal temperature rating of the trigger, the trigger operates thereby permitting ejection and release of the sealing assembly and the discharge of fluid through the unsealed sprinkler head. There are generally two types of thermally responsive triggers: frangible and non-frangible. Non-frangible actuators can include fusible links or soldered mechanical arrangements in which the components of the assembly separate upon fusion of the solder reaching its rated temperature. Frangible actuators generally include a thermally responsive liquid-filled frangible glass bulb that shatters upon reaching its rated temperature.

Exemplary embodiments of automatic fire protection sprinklers having a thermally responsive glass bulb trigger and coaxially aligned seal assembly are shown and described in U.S. Pat. Nos. 4,167,974; 4,796,710 and 4,938,294. In the embodiments shown, a screw member compresses against the thermally responsive glass trigger to support the seal assembly over the sprinkler discharge orifice against incoming hydraulic and reactive forces acting on the seal assembly. Accordingly, the glass bulb trigger and seal assembly arrangement are in a compressed state subject to forces acting in opposite directions. The prior art patents teach that the thermal response of a glass bulb trigger can be affected by the forces acting on the bulb. U.S. Pat. No. 4,167,974 specifically teaches a glass bulb trigger and seal assembly arrangement to reduce the forces acting on the glass bulb. In particular, U.S. Pat. No. 4,167,974 teaches a flexible seal over the discharge orifice that is centrally acted upon by a coaxially aligned glass bulb trigger to provide a flexibility in the arrangement to minimize the hydraulic and reactive forces that act on the glass bulb. Moreover, U.S. Pat. No. 4,167,974 teaches that the sprinkler arrangements provide for compressive loading on the glass bulb trigger sufficient to seal the sprinkler that is less than a force generated by a burst pressure that would cause the sprinkler to leak.

The hydraulic forces acting against the glass bulb and seal assembly are directly related to the fluid pressure flowing through the area of the discharge orifice of the sprinkler. Generally, the size of the area of the sprinkler discharge orifice is defined by the nominal K-factor of a sprinkler. For a given sprinkler assembly, the larger the K-factor, the larger the discharge orifice, and the smaller the K-factor, the smaller the discharge orifice. As is known in the art, the K-factor of a sprinkler is defined as $K=Q/P^{1/2}$, where Q represents the flow rate (in gallons/min (GPM)) of water from the outlet of the internal passage through the sprinkler body and P represents the pressure (in pounds per square inch (psi.)) of water or firefighting fluid fed into the inlet end of the internal passageway though the sprinkler body.

Commercially available fire protection sprinklers are generally subject to industry accepted fire code requirements and the approval of the "authority having jurisdiction" (AHJ) to ensure compliance with the applicable codes, standards and requirements. For example, one applicable standard is "NFPA 13: Standard for the installation of Sprinkler Systems" (2019) ("NFPA 13") from the National Fire Protection Association (NFPA). NFPA provides minimum requirements for the design and installation of automatic fire sprinkler systems based upon the area to be protected, the anticipated hazard, the type of protection performance to be provided and the size and thermal response of the sprinkler to be used. One type of commercial fire protection sprinkler is the "Early Suppression Fast Response (ESFR) Sprinkler". NFPA 13 defines ESFR sprinklers as a "type of fast-response sprinkler that has a thermal element with an RTI of 50 (meters-seconds)$^{1/2}$ $(m \cdot s)^{1/2}$ or less and is listed for its capability to provide fire suppression of specific high-challenge fire hazards." Nominal K-factors for sprinklers identified in NFPA 13 range from 1 to 30 $[GPM/(psi.)^{1/2}]$. For the purposes herein, sprinklers having a large orifice area are those sprinklers with a nominal K-factor of 14 $[GPM/(psi.)^{1/2}]$ ("K14") or greater. NFPA 13 identifies the following nominal K-factors of 14 or greater: 14 $[GPM/(psi.)^{1/2}]$ ("K14"); 16.8 $[GPM/(psi.)^{1/2}]$ ("K16.8"); 19.6 $[GPM/(psi.)^{1/2}]$ ("K19.6"); 22.4 $[GPM/(psi.)^{1/2}]$ ("K22.4"); 25.2 $[GPM/(psi.)^{1/2}]$ ("K25.2") and 28.0 $[GPM/(psi.)^{1/2}]$ ("K28").

"Fire suppression" is a type of sprinkler system protection performance. NFPA 13 defines the performance of fire protection systems based upon the manner in which the system and its automatic fire sprinklers are designed to address a fire. For example, a system and its sprinklers can be configured to address a fire with "fire control" which is defined under NFPA 13 as "limiting the size of a fire by distribution of water so as to decrease the heat release rate and pre-wet adjacent combustibles, while controlling ceiling gas temperatures to avoid structural damage." "Fire suppression" performance, as defined under NFPA 13, is "sharply reducing the heat release rate of a fire and preventing its regrowth by means of direct and sufficient application of water through the fire plume to the burning fuel surface." As used herein, "suppression" systems or sprinklers are defined as systems or sprinklers that sharply reduce the heat release rate of a fire and prevent its re-growth by directly and sufficiently applying water or other fire suppressant through the fire plume to the burning fuel source. Examples of large orifice ESFR sprinkler embodiments with glass bulb triggers are shown and described in U.S. Pat. No. 9,717,936 and U.S. Patent Application Publication No. 20180071562.

One manner of identifying fire protection sprinklers with a configuration of components and fluid deflector capable of a particular thermal response or sensitivity and performance is through appropriate industry accepted operational testing. To facilitate the AHJ approval process, fire protection equipment can be "listed," which as defined by NFPA 13, means that the equipment is included in a list by an organization that is acceptable to the AHJ and whose list states that the equipment "meets appropriate designated standards or has been tested and found suitable for a specified purpose." One such listing organization includes, Underwriters Laboratories Inc. ("UL"). "UL 1767 Standard for Safety Early-Suppression Fast Response Sprinklers" (4th ed. 2013, rev. 2015) from Underwriters Laboratories Inc. ("UL1767") provides various test standards to establish that a sprinkler's designed configuration of components is suitable for early suppression fast response (ESFR) performance under applicable installation guidelines. Requirements of UL1767 have since been consolidated in, "UL 199 Standard for Automatic Sprinklers for Fire-Protection Service" (12th ed. Apr. 28, 2020). Once appropriately approved, a sprinkler manufacturer can use the approved sprinkler designed configuration for replication. Examples of commercially available ESFR Sprinklers having glass bulb triggers include: (i) the Fire-Lock® V48, K25,2 Model V4802 Early Suppression Fast Response (ESFR) sprinkler from Victaulic Company shown in Product Data Sheet 40.91 12089 Rev E (March 2019); and (ii) the TYCO Model ESFR-14, 14.0 K-factor Pendent Sprinklers, Early Suppression, Fast Response from Johnson Controls of Lansdale, PA and shown in Tyco Technical Data Sheet TFP319 (August 2018).

Under UL1767, a thermally responsive glass bulb trigger in an ESFR sprinkler has an RTI of no more than 65 $(ft \cdot s)^{1/2}$ [36 $(m \cdot s)^{1/2}$]. Additionally, included in the UL1767 test standards are ESFR test requirements and criteria to evaluate the configuration of components of a sprinkler and the ability of the thermally responsive glass bulb trigger to maintain the seal assembly in fluid tight sealed engagement over the discharge orifice. For example, UL1767 outlines a leakage test in which at least twenty (20) samples of a sealed sprinkler are individually tested. Each test sprinkler is filled at its inlet with water and vented of air. The fluid pressure is increased from 0 to 500 psig. (0 to 3.45 MPa) at a rate not exceeding 300 psig. (2.07 MPa) per minute and held for one minute. In order for a test sprinkler to satisfy or pass the leakage test, the test sprinkler shall not exhibit any visible leakage at any test pressure. Additionally, UL1767 outlines a hydrostatic strength test in which twenty (20) samples of a sealed sprinkler are individually tested. Each test sprinkler is filled at its inlet with water and vented of air. The fluid pressure is increased from 0 to 700 psig. (0 to 4.8 MPa) at a rate not exceeding 300 psig. (2.07 MPa) per minute. The pressure is to be maintained at 700 psig. (4.8 MPa) and held for one minute (1 min.). In order for a test sprinkler to satisfy or pass the strength test, the test sprinkler shall not rupture, operate or release any of the sprinkler operating parts during the pressure increase nor while being maintained at 700 psig. (4.8 MPa) for one minute.

Also included among the UL1767 test standards are ESFR test requirements and criteria to evaluate the configuration of components and the ability of the thermally responsive glass bulb trigger of a sprinkler to operate when the sprinkler is exposed to a liquid test bath heated to a temperature within an acceptable range of the nominal temperature rating. In one operating temperature bath test, at least ten (10) sprinkler test samples of a given operating temperature rating are tested in a water or oil bath. The test sprinklers are placed in an upright orientation in the bath. The bath is provided with a heat source to heat the liquid at a reasonable or "convenient" rate until the liquid is within 20° F. (11° C.) of the temperature rating of the device. The temperature is then increased at a rate not exceeding 1° F. (0.5° C.) per minute until operation of the sprinkler or until a temperature 20° F. (11° C.) above the operating temperature rating of the device. The temperature of the liquid bath and time at sprinkler operation is recorded for each test sprinkler. In order for a sprinkler to satisfy the bath test, the temperature at which the sprinkler operated shall be within +3.5 percent of the nominal temperature rating of the sprinkler.

Under the current testing standards, sprinkler designed configurations for known sprinkler assemblies are being approved for their specified purpose. Despite all the testing and evaluation however, the inventor has recognized that manufactured known suppression mode sprinklers and their configuration of components, when tested, fail to provide a consistent thermal response within an acceptable range of their nominal temperature rating. Thus, there remains a need for sprinkler assemblies with an arrangement of components that consistently maintains its anticipated thermal response.

DISCLOSURE OF INVENTION

The inventor has discovered that hydrostatically testing fire protection sprinklers can adversely affect the sprinkler's thermal response of a glass bulb trigger in a configuration of components when subsequently subjected to a thermal bath test. In particular, the inventor has discovered that some suppression sprinklers with a glass bulb trigger and a K-factor greater than K14 thermally respond or perform outside of their nominal temperature rating when initially subjected to a hydrostatic strength test. It is believed that in known configurations of components for sprinklers, there are inherent inconsistencies from sprinkler-to-sprinkler such that some sprinklers may fail to properly thermally perform as expected following hydrostatic testing.

The inventor's discovery has led to a preferred fast response suppression sprinkler, preferably an early suppression fast response (ESFR) sprinkler assembly, with an operational arrangement that minimizes or eliminates performance inconsistencies. Accordingly, preferred embodiments of the sprinkler assembly include an operational arrangement having a glass bulb trigger that consistently provides a thermal response for the intended purpose of the sprinkler. The preferred sprinkler assemblies, when subjected to a thermal bath after hydrostatic testing, respond in accordance with the nominal thermal rating the bulb subject to an accepted level of variance. In preferred embodiments of the sprinkler assembly, a sprinkler frame, load screw, glass bulb trigger and sealing assembly are configured to define the preferred operational assembly that facilitates satisfactory performance in sequential leak and bath testing. In a preferred aspect, sample testing of the preferred fire suppression sprinkler assemblies and operational arrangements appropriately thermally responded in a thermal bath test following a hydrostatic leak test. The passage rate of the sample test group is believed to be greater than any other known sprinkler arrangement.

In one preferred embodiment of a fire protection sprinkler for fire suppression performance, the sprinkler includes a frame having a body defining an inlet, an outlet orifice and an internal passageway extending along a sprinkler axis between the inlet and the outlet to define a discharge orifice having a nominal K factor of 14 [GPM/(psi)$^{1/2}$] or greater. The body includes a sealing surface formed about the outlet and centered about the sprinkler axis; and a pair of frame arms extending from the body and converging toward one another to form a frame boss. A fluid deflector for suppression performance is supported by the frame boss at a fixed axial distance from the outlet with a load screw engaged with the frame boss. A sealing assembly is disposed in the outlet. The sealing assembly includes an annular sealing disc that defines a peripheral diameter and an inner diameter. The sealing disc has a first surface and an opposite second surface with the first surface in fluid tight contact with the sealing surface. A thermally responsive fast response glass bulb trigger, having an operational response time index of no more than 65 (ft·s)$^{1/2}$ and a nominal temperature rating ranging from 135° F. to 300° F., is disposed along the sprinkler axis to support the sealing assembly in the outlet. The frame, load screw, glass bulb trigger, and sealing assembly form an operational arrangement that maintains a fluid tight seal against a fluid pressure of at least 500 psi. and subsequently maintains 95%-105% of the nominal temperature rating of the glass bulb trigger.

Preferred embodiments of a fire protection sprinkler provide for a group of preferably fifteen or more fast response suppression sprinklers with each sprinkler including an operational arrangement having: a frame, a load screw and a thermally responsive glass bulb trigger and sealing assembly arrangement. The frame includes a body defining an inlet, an outlet and an internal passageway extending along a sprinkler axis between the inlet and the outlet to define a discharge orifice with a nominal K factor of 14 [GPM/(psi)$^{1/2}$] or greater. The body includes a sealing surface formed about the outlet and centered about the sprinkler axis. The load screw is aligned along the sprinkler axis and spaced from the outlet. The thermally responsive glass bulb trigger and sealing assembly arrangement are disposed between the sealing surface and the load screw to form a fluid tight seal in the outlet. The glass bulb trigger and sealing arrangement are coaxially aligned with one another along the sprinkler axis. The glass bulb trigger has a nominal operating temperature rating and an operational response time index rating of no more than 65 (ft·s)$^{1/2}$. The group of fifteen or more sprinklers are preferably subjected to a hydrostatic test and a subsequent thermal response bath test in which each of the sprinklers withstands an internal fluid test pressure of at least 500 psig. At least 95% of the group of sprinklers operate in the thermal response bath test at a temperature that is within 95%-105% of the nominal temperature rating of the sprinklers.

Preferred methods of verifying and providing operational arrangements for incorporation into a preferred sprinkler platform are also provided. In a preferred aspect, the preferred methods include sequential testing to verify that a configuration of components define a preferred operational arrangement that can be appropriately incorporated into a sprinkler assembly platform and replicated. In another preferred aspect, the configuration of components and sequential testing provide a preferred method of fire protection that includes obtaining a sprinkler assembly with the preferred operational arrangement and providing the sprinkler assembly for fast response protection.

In one preferred method of providing an operational arrangement for fast response suppression fire protection sprinklers, the method includes defining a configuration of components having a sprinkler frame, a load screw and a thermally responsive glass bulb trigger and sealing assembly arrangement. The sprinkler frame has a body defining an inlet, an outlet orifice and an internal passageway extending along a sprinkler axis between the inlet and the outlet to define an orifice with a nominal K factor of 14 [GPM/(psi)$^{1/2}$] or greater. The body includes a sealing surface formed about the outlet and centered about the sprinkler axis. A load screw is preferably aligned along the sprinkler axis and spaced from the outlet; and a thermally responsive glass bulb trigger and sealing assembly arrangement is disposed between the sealing surface and the load screw to form a fluid tight seal in the outlet. The glass bulb trigger and sealing arrangement are coaxially aligned with one another along the sprinkler axis with the glass bulb trigger having a nominal temperature rating and an operational response time index rating of no more than 65 (ft·s)$^{1/2}$. The preferred method includes testing the configuration of components to withstand an internal fluid test pressure of 500 psig. and subsequently testing the configuration of components in a thermal response bath test for operation at a temperature that is within ±3.5 percent of the nominal temperature rating so as to verify that the configuration of components defines an operational arrangement.

Another preferred method provides a method of providing fire protection that includes obtaining a sprinkler with an operational arrangement; and providing the sprinkler assembly for fast response suppression mode fire protection. Obtaining a sprinkler preferably includes obtaining a configuration of components including a sprinkler frame having a body with a nominal K factor of 14 [GPM/(psi)$^{1/2}$] or greater; a load screw; and a thermally responsive glass bulb trigger and sealing assembly arrangement having a nominal temperature rating and an operational response time index rating of no more than 65 (ft·s)$^{1/2}$. The preferred method includes verifying that the configuration of components defines an operational arrangement in a sequential hydrostatic test and thermal response bath test. Preferred embodiments of the method include obtaining a group of fifteen or more sprinklers and verifying that at least 95% of the sprinklers in the group have a configuration of components defining an operational arrangement. Other preferred embodiments of the method include obtaining one hundred sprinklers and replicating the configuration of the components.

BRIEF DESCRIPTION OF DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1:
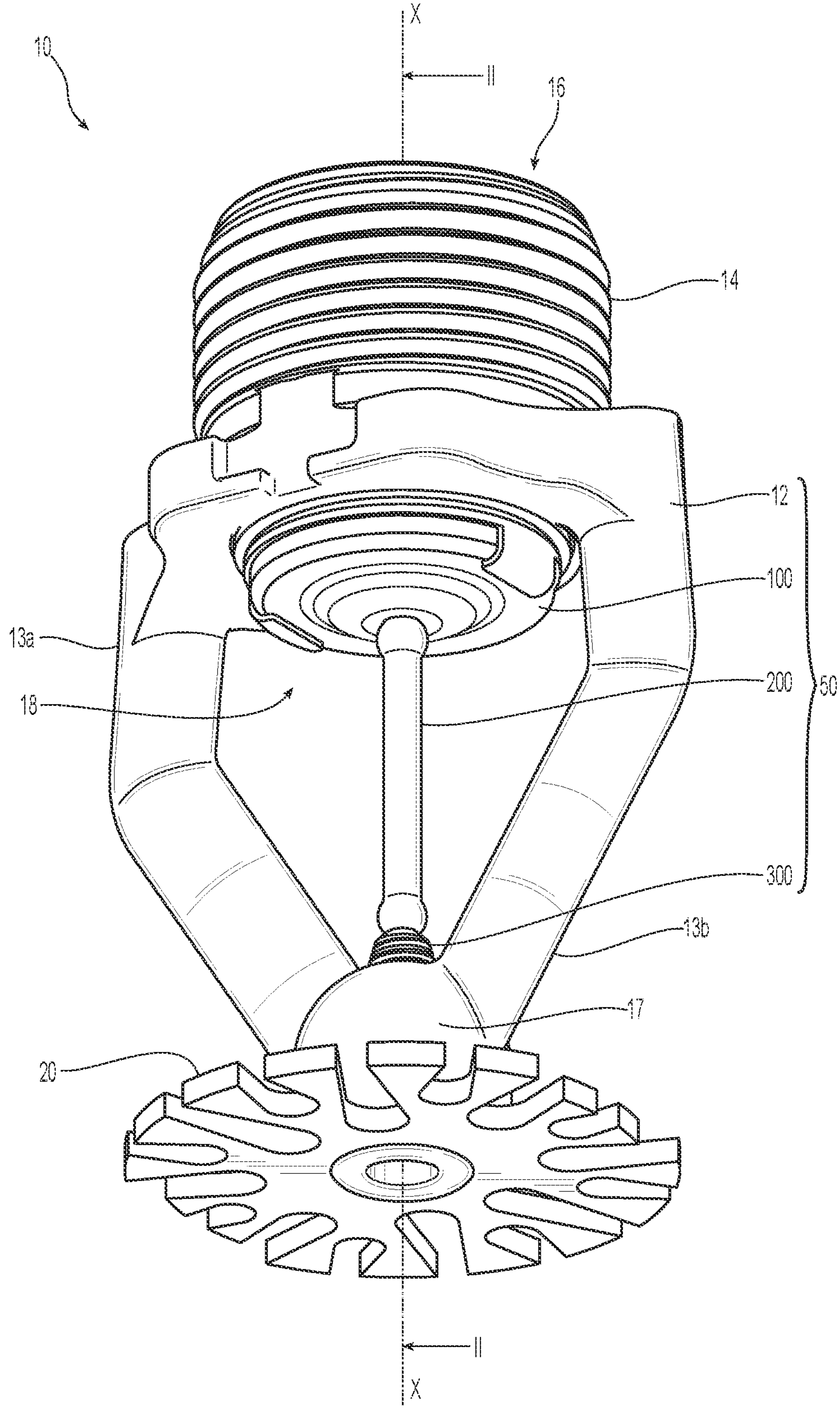
FIG. 1 is a perspective view of a preferred embodiment of a fire protection sprinkler.

Shown in FIG. 1 is an illustrative embodiment of a preferred suppression fire protection sprinkler 10; and in particular, a suppression mode sprinkler 10 such as for example, an ESFR sprinkler. The sprinkler 10 is preferably embodied as an automatic sprinkler with a frame 12 having a body 14 with a fluid inlet 16 for connection to a firefighting fluid supply pipe and an outlet 18 from which the firefighting fluid is discharged to impact a fluid distribution deflection member or deflector 20. Each of the inlet 16, outlet 18 and deflector 20 are preferably centered along and axially aligned and spaced apart from one another by the sprinkler axis X-X. Although the sprinkler 10 is shown configured for installation in a pendent type orientation with the fluid distribution deflector 20 appropriately configured and coupled to the frame 12, it should be understood that the sprinkler 10 can be alternatively configured with an appropriate fluid deflection member for other types of installations such as, for example, an upright or horizontal/sidewall orientation.

Embodiments of the sprinkler 10 include a preferred configuration of components defining an operational arrangement 50 capable of satisfying sequentially performed hydraulic and thermal testing. The operational arrangement 50 provides a thermally responsive automatic fire protection sprinkler assembly platform for storage protection and/or fast response early suppression that can be replicated. The preferred operational arrangement 50 includes the frame 12, a seal assembly 100, a frangible thermally responsive glass bulb 200 and a compression screw 300 in a defined configuration and/or relative relationship. The seal assembly 100 is supported within outlet 18 of the sprinkler body 14 by the thermally responsive element glass bulb 200 aligned along the sprinkler axis X-X between the sealing assembly 100 and the compression or load screw 300. The load screw 300 is preferably threaded into the frame 12, aligned with the sprinkler axis X-X and axially spaced from the outlet 18. The frame 12 preferably includes a pair of frame arms 13*a*, 13*b* that extend from the body 14 and converge toward one another to form a frame boss 17 centered along the sprinkler axis X-X to support the fluid deflector 20 at an axial distance from the outlet 18. An internally threaded through bore is formed within the frame boss 17 into which the load screw 300 is preferably threadedly engaged. The load screw 300 contacts the bulb 200 and applies a loading or compressive force against the bulb 200 defined by its threaded engagement with the frame 12. The glass bulb trigger 200 transfers the compressive force to the seal assembly 100 to support and maintain the sealing assembly 100 within the outlet 18, which forms a fluid tight seal therebetween.

Although the rated temperature and thermal sensitivity of a bulb defines its thermal responsiveness, the thermal actuation of a bulb is also a function of the forces or loads acting on the bulb including the sealing and hydrostatic forces acting on the bulb. The inventor has discovered that in previously known sprinkler assemblies, the configuration of components is subjected to forces in the course of manufacturing and/or testing that can adversely affect the thermal response of a glass bulb trigger. In particular, the inventor has discovered that in some previously known suppression sprinklers, when subjected to a hydrostatic test and a subsequent thermal response test, the sprinklers thermally operate in the bath test outside an acceptable range of variance of the sprinkler's nominal temperature rating.

In light of inventor's discovery, embodiments of a fire protection sprinkler 10 include a configuration of components that define a preferred operational arrangement 50 which maintains (i) a fluid tight seal under a high fluid pressure; and (ii) subsequently maintains its thermal performance in accordance with the nominal temperature rating of the sprinkler when subjected to a correspondingly heated environment. As used herein, an "operational arrangement" is defined as a preferred configuration of components that provides, with consistency, a thermal response in accordance with the nominal temperature rating of the sprinkler. "Consistency," as used herein in defining an operational arrangement, is determined by sample testing that verifies that a sprinkler assembly incorporating an operational arrangement works for its intended purpose. For example, in a preferred sample test, the configuration of components works for its intended purpose in which at least 95% out of a sample size of preferably fifteen or more sprinklers, more preferably up to one hundred (100) sample sprinklers, successfully pass sequential hydrostatic and thermal operational testing. The tested configuration of components can therefore be said to be an operational arrangement. In a more preferred embodiment, the operational arrangement is shown by the configuration of components working for their intended purpose in a sample test in which 100% out of a sample size of fifteen or more sprinklers, more preferably up one hundred (100) sample sprinklers, successfully pass sequential hydrostatic and thermal operational testing. Sample sizes of preferred sprinklers described herein have been subjected a hydrostatic leak test and subsequent bath test performed in accordance with UL 1767 to demonstrate sealing and thermal consistency and thus the operational arrangements of the preferred sprinklers. It is believed that the preferred sprinklers 10 satisfy the sequentially performed tests at a success rate that is higher than any other previously known sprinkler.

As described herein, the sprinkler frame 12, seal assembly 100, thermally responsive glass bulb trigger 200 and load screw 300 present a preferred configuration of components of the sprinkler 10 that individually and collectively define various preferred embodiments of the preferred operational arrangement 50. Preferred embodiments of the operational arrangements 50 maintain a fluid tight seal against a fluid pressure of at least 500 psi. and subsequently maintain 95%-105% of the nominal temperature rating of the glass bulb trigger and more preferably at least 98%-102% of the nominal temperature rating. In randomized sample testing of fifteen or more similarly configured sprinklers having the preferred configuration of components, the test sprinklers thermally responded within an acceptable variance (95%-105%) of their nominal temperature rating in a liquid bath test subsequent to hydrostatic leak testing in which each of the tests were performed in accordance with UL 1767. Accordingly, the preferred configuration of components defines the preferred operational arrangement 50.

Figure 2:
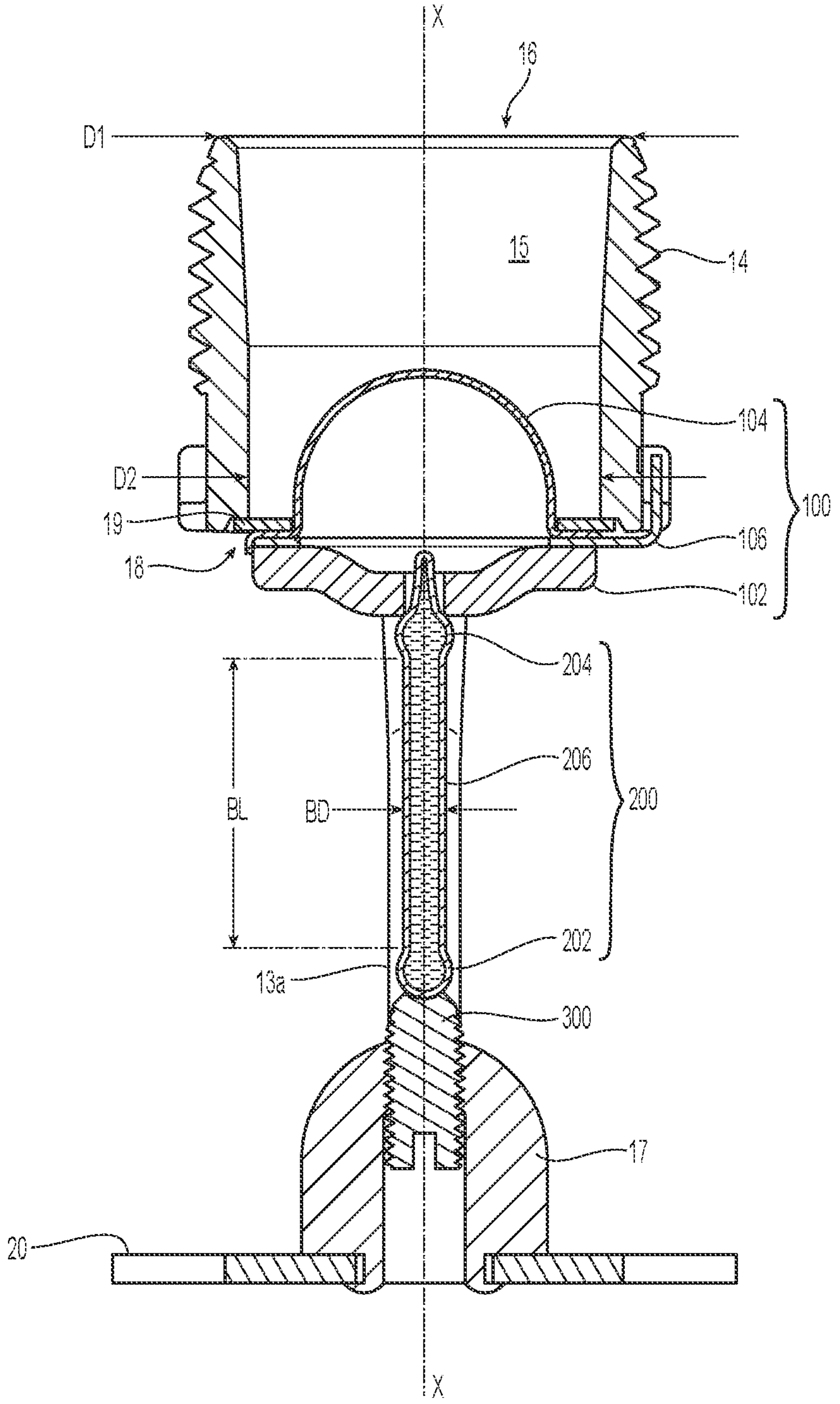
FIG. 2 is a cross-sectional view of the fire protection sprinkler of FIG. 1 along line II-II.

Shown in FIG. 2 is a cross-sectional view of a preferred embodiment of the sprinkler 10. In the body 14, an internal passageway 15 extends between the fluid inlet 16 and the outlet 18 spaced apart from one another and axially aligned along a sprinkler axis X-X to define the sprinkler discharge orifice and its discharge characteristics. To connect to a fluid supply pipe, the body 14 is preferably configured with an external thread, preferably a one inch (1 in.) NPT thread. Alternatively, the body 14 can be configured for other types of mechanical connection such as, for example, a grooved connection or a welded connection. Internally, the discharge characteristics of the sprinkler body define a preferred nominal K-factor in a range of 11 [GPM/(psi)$^{1/2}$] to 50 [GPM/(psi)$^{1/2}$]. More particularly, preferred embodiments of the sprinkler 10 define a nominal K-factor equal to or greater than 14 [GPM/(psi)$^{1/2}$] up to 36.4 [GPM/(psi)$^{1/2}$] and are yet even more preferably any one of K14.0, K16.8, K19.6, K22.4, K25.2; K28.0; K32; K33.6 or K36.4 [GPM/(psi)$^{1/2}$]. Geometrically, the internal passageway 15 preferably tapers narrowly from the inlet 16 to the outlet 18. Depending upon the nominal K-factor of the sprinkler body, the inlet preferably defines a diameter D1 that ranges from 0.75-1.25 inches (19-31.75 mm.) and the outlet 18 defines a smaller diameter D2 that preferably ranges from 0.7_1 inch (17.8-25.4 mm). Summarized below are the corresponding diameters for preferred nominal K-Factors in preferred embodiments of the sprinkler body 14.

TABLE 1

| Nominal K-Factor (GPM/(psi)$^{1/2}$) [LPM/(bar)$^{1/2}$] | Diameter D1 (in) [mm.] | Diameter D2 (in) [mm.] |
|---|---|---|
| 14.0 (200) | 0.772 (19.6) | 0.706 (17.9) |
| 16.8 (240) | 0.825 (20.9) | 0.773 (19.6) |
| 19.6 (280) | 1.028 (26.1) | 0.812 (20.6) |
| 22.4 (320) | 1.028 (26.1) | 0.884 (22.5) |
| 25.2 (360) | 1.028 (26.1) | 0.939 (23.9) |
| 28.0 (400) | 1.049 (26.6) | 0.987 (25.1) |
| 32/33.6 (440) | 1.049 (26.6) | 1.041 (26.4) |

Figure 3:
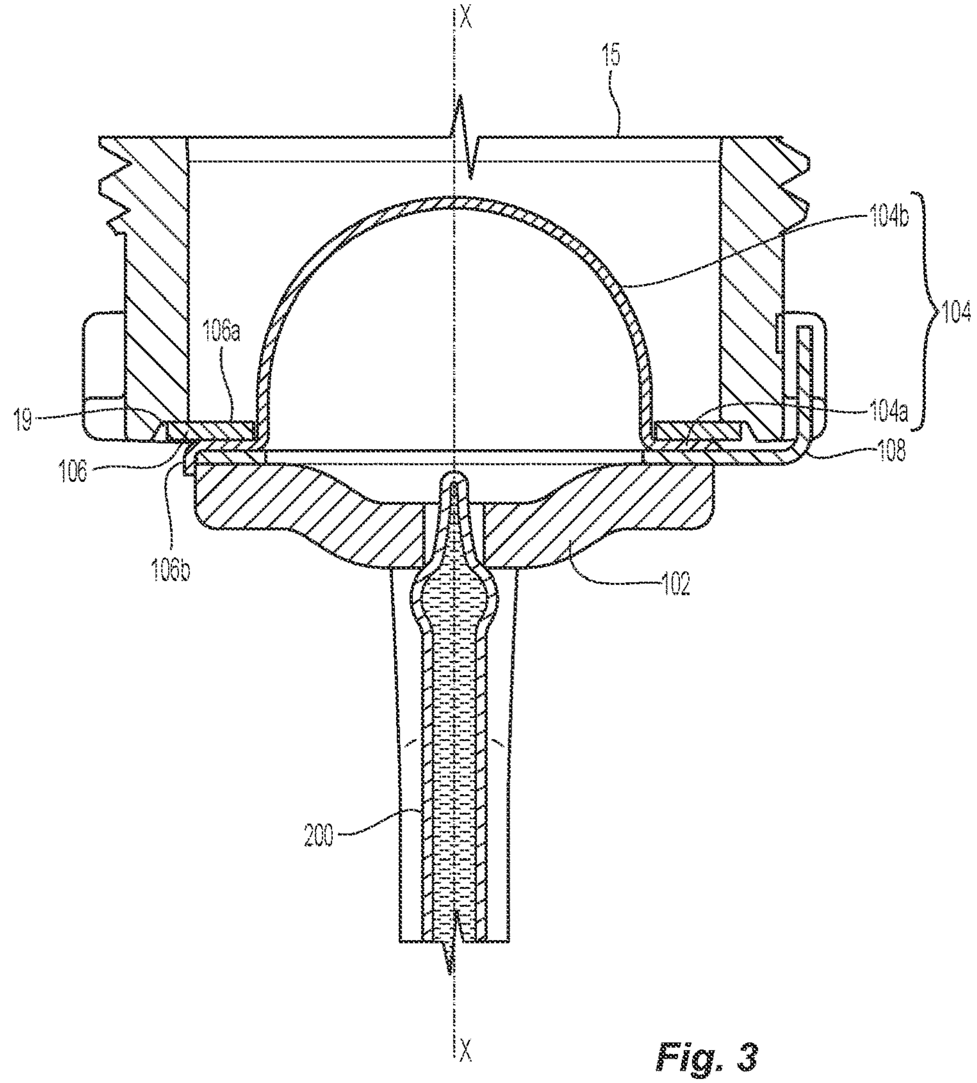
FIG. 3 is a detailed view of the cross-section of FIG. 2.
Figure 4:
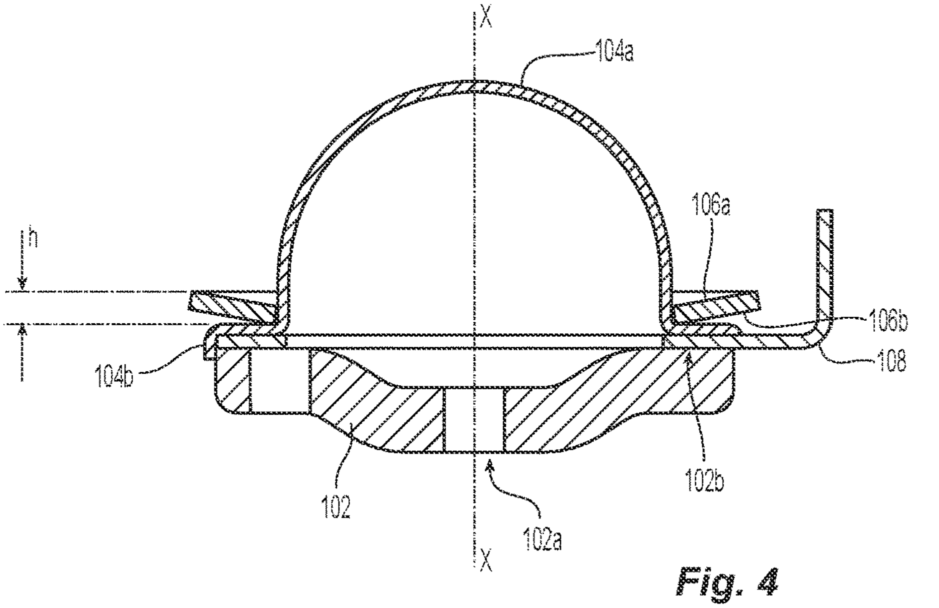
FIG. 4 is a cross-sectional view of a seal assembly for use in the fire protection sprinkler of FIG. 1.

Formed about the outlet 18 and centered about the sprinkler axis X-X is an annular sealing surface seat 19 for a fluid tight engagement with the seal assembly 100. Accordingly, the sealing assembly 100 is configured to have a size and stiffness to occlude the outlet 18 and form the fluid tight sealed engagement under opposing hydraulic and compressive forces. With reference to FIG. 3, the seal assembly 100 preferably includes a seating disc 102 for engaging the bulb 200, a shell cap sub-assembly 104 which extends through the outlet 18 and into the passageway 15, and a resilient sealing disc 106 for fluid tight surface engagement with the annular sealing surface seat 19. Shown in FIG. 4 is the sealing disc 106 in an uncompressed state disengaged from compressive or hydrostatic loading. In its uncompressed state, the sealing disc 106 is preferably a conically-shaped, washer-like or disc-like spring. A preferred disc is a Bellville spring fabricated from a beryllium nickel alloy such as a Berylco brand Beryllium Nickel Alloy 440, one-half hard Spec. No. 036940-M. The preferred sealing disc 106 compresses from its conical, relaxed state towards a flattened state, as seen in FIG. 3, to form a fluid tight engagement with the sealing surface 19. The compression spring rate of the sealing disc 106 is defined by a preferably nonlinear load-deflection curve. In a preferred embodiment, the spring rate is within a preferred range of 85 to 100 lbs. per inch at an overall height h of approximately 0.021 inches. More preferably, the minimum compression spring rate is 60 lb. per inch at an overall height h of approximately 0.034 inches.

Figure 4A:
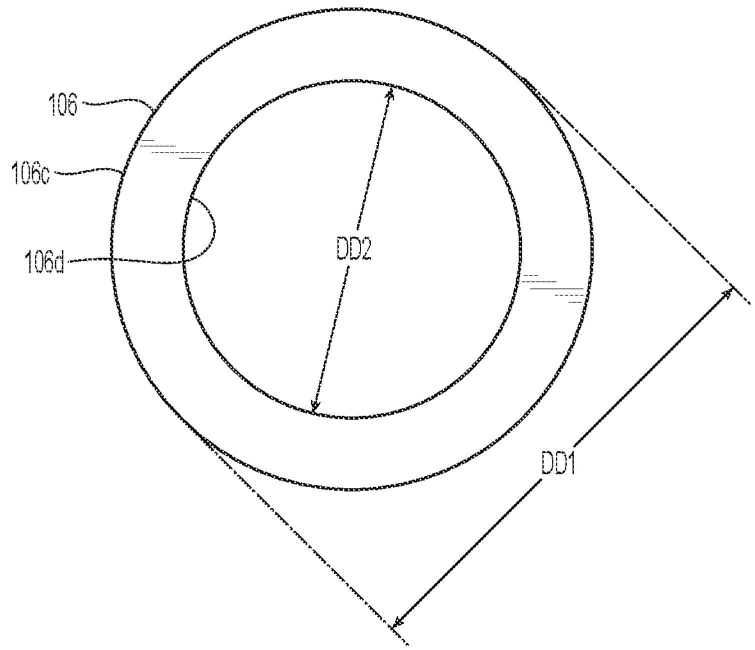
FIG. 4A is a plan view of a sealing disc for use in the seal assembly of FIG. 4.

As seen in FIG. 3, the sealing disc 106 has a first surface 106*a* that engages the frame sealing seat 19 and a second surface 106*b* opposite the first surface 106*a* that confronts the seating disc 102. The sealing disc 106 and its first surface 106*a* extends radially inward for exposure to the internal passageway 15 and the fluid flowing therethrough. Shown in FIG. 4A is a plan view of the sealing disc 106. The annular sealing disc 106 has a peripheral edge 106*c* that defines a preferred outer diameter DD1 and an internal circular edge 106*d* that defines a central aperture and an inner diameter DD2. The diameters DD1, DD2 are preferably defined as a function of the geometry of the sprinkler body 14 and more preferably a function of the nominal K-factor of the body 14. Generally, for nominal K-factors ranging from K14-K17, the outer diameter DD1 preferably ranges from about 0.75-0.85 inch and the inner diameter DD2 preferably ranges from about 0.45-0.62 inch. For nominal K-factors ranging from K19-K28, the outer diameter DD1 is preferably about one inch and the inner diameter DD2 is preferably about 0.75 inch. Summarized in the table below are preferred outer and inner diameters DD1, DD2 of the sealing disc 106 corresponding to a preferred nominal K-factor.

TABLE 2

| Nominal K-Factor (GPM/(psi)$^{1/2}$) [LPM/(bar)$^{1/2}$] | Outer Dia. DD1 (in) [mm.] | Inner Dia. DD2 (in) [mm.] |
|---|---|---|
| 14.0 (200) | 0.844 (21.4) | 0.468 (11.9) |
| 16.8 (240) | 0.844 (21.4) | 0.468 (11.9) |
| 19.6 (280) | 1.063 (27) | 0.746 (18.9) |
| 22.4 (320) | 1.063 (27) | 0.746 (18.9) |
| 25.2 (360) | 1.063 (27) | 0.746 (18.9) |
| 28.0 (400) | 1.063 (27) | 0.746 (18.9) |

In the preferred sealing assembly 100 of FIG. 4, the shell cap 104 includes a bulbous body portion 104*a* that extends through the central aperture of the sealing disc. In the sprinkler assembly 10, the bulbous body portion 104*a* extends into the internal passageway 15 presenting a substantially semi-spherical surface to the fluid flow through the passageway 15. A flange portion 104*b* of the shell cap engages the second surface 106*b* of the sealing disc 106 opposite the first surface 106*a*. Affixed to the flange portion 104*b* is the seating disc 102.

Figure 4B:
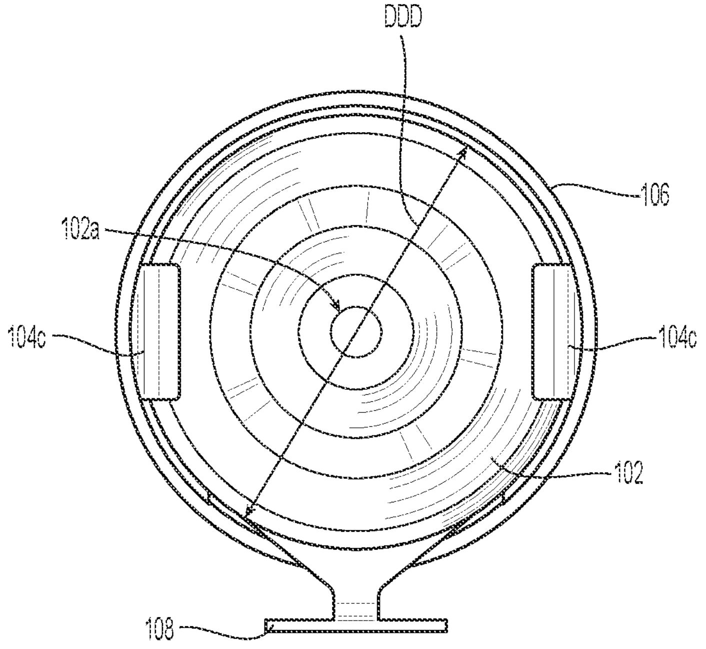
FIG. 4B is a plan view of the sealing assembly of FIG. 4.

With reference to FIGS. 4 and 4B, the flange portion 104*b* includes one or more projections 104*c* to affix the seating disc 102 to the shell cap 104. The seating disc 102 includes a central opening 102*a* to seat the bulb 200. The seating disc 102 includes an annular lip 102*b* formed about the central opening 102*a* to confront the flange portion 104*b* of the shell cap 104. Preferably, secured between the seating disc 102 and the shell cap is another annular member including a leg 108 for forming a pivoted engagement with the body 12 to facilitate ejection of the sealing assembly 100. The seating disc 102 defines a diameter DDD so that the confronting surface of the annular lip 102*b* of the seating disc 102 defines a footprint that overlaps the sealing disc 106. In a preferred embodiment of the sprinkler assembly 10 with a nominal K-factor ranging from K14-K17, the diameter DDD of the seating disc ranges from about 0.75 to 0.85 inch (19-21.6 mm) and is preferably 0.84 inch (21.3 mm). With a nominal K-factor ranging from K19-K28, the diameter of the seating disc ranges from about 0.5 inch to less than 0.75 inch (12.7-19 mm) and is preferably 0.53 inch (13.5 mm). With reference to FIG. 4, the foot print of the annular lip 102*b* initiates radially inward of the peripheral edge 106*c* of the sealing disc 106 and extends radially inward of the inner edge 106*d* of the sealing disc. Given the overlap between the seating disc 102 and the sealing disc 106, the seating disc 102 and its annular lip 102*b* distributes the compressive force from the bulb 200 in an annular or peripheral fashion about the sprinkler axis X-X. Moreover, with the central opening 102*a* of the seating disc 102 located axially preferably further away from the sealing disc 106 than the annular lip 102*b*, the force exerted by the bulb 200 on the seating disc 102 is transferred peripherally over the sealing disc 106.

The thermally responsive glass bulb 200 is preferably nominally thermally rated within a range of 135° F. to 380° F. and more preferably in a range from 135° F. to 300° F. and is preferably thermally rated at any one of a nominal 135° F., 155° F., 165° F., 175° F., 200° F., 205° F., 220° F., or 280° F. Other applicable nominal temperature ratings can include 140° F., 220° F., 280° F., 286° F. or 360° F. More preferably, for a preferred ESFR sprinkler, the bulb 200 defines a nominal temperature rating of 165° F. or 200° F. The speed or sensitivity with which the bulb 200 thermally responds to a fire or sufficient level of heat is preferably faster than "standard response", e.g., quick response, fast response or early fast response, with a preferred operational response time index (RTI) of 100 $(ft \cdot s)^{1/2}$ [50 $(m \cdot s)^{1/2}$] or less, no more than 65 $(ft \cdot s)^{1/2}$ [36 $(m \cdot s)^{1/2}$], and in particularly ranges from 35-65 $(ft \cdot s)^{1/2}$ [19 to 36 $(m \cdot s)^{1/2}$].

Preferred embodiments of the thermally responsive bulb 200 are shown and described in U.S. Pat. Nos. 4,796,710 and 4,938,294. Illustrative commercial embodiments of the glass bulb 200 include Thermo Bulb glass bulbs from JOB of Ahrensburg, Germany. The bulb 200 has a glass envelope with first spherical end 202 engaged with the screw member 300 and a second teardrop end 204 engaged with the seating disc 102. A tubular column 206 of a constant diameter extends between the first and second ends 202, 204. The tubular column 206 has a preferred bulb length BL length that ranges from 0.6-1.2 inches (15-30 mm), more preferably about 0.8-1.1 inch (20-27 mm) and is even more preferably one of 0.8 in. (20 mm) or 1.1 inch (27 mm). The bulb diameter BD can be 0.2 in (5 mm) or greater, but more preferably is less than 0.2 in. (5 mm), preferably ranging between 0.08-0.2 in. (2-4 mm.) and preferably is one of 0.1 in. (2.7 mm) or 0.11 in. (3 mm). The first and second ends 202, 204 preferably have external diameters that are greater than the diameter of the tubular column 206 to provide a desired strength. The glass bulb 200 is structural member subject to the compressive forces between the force applied by the load screw 300 and the forces acting in opposition through the seal assembly 100.

In the sprinkler assembly 10 shown in FIGS. 1 and 2, the load screw 300 is threadedly engaged with the frame boss 17 to engage the glass bulb 200 and apply a compressive mode to maintain the seal assembly 100 in a fluid tight sealed engagement with the sealing surface 19 of the frame body 14. The load screw 300 preferably includes a concave tip for surface engagement with the spherical end 202 of the glass bulb trigger 200. The applied force from the load screw 300 is of a magnitude that maintains the preferably conical sealing disc 106 in a collapsed, flattened or reduced height sufficient to form the fluid tight engagement between the sealing disc 106 and the sealing surface 19. Moreover, the compressive load applied by the load screw 300 is of a magnitude to maintain the fluid tight seal against the reactive force from the sealing surface 19 against the sealing disc 106, the spring force of the sealing disc 106 itself and the hydraulic force generated by fluid pressure introduced into the internal passageway 15 that acts against the first surface 106*a* of the sealing disc and the bulbous body 104*b* of the shell cap 104.

The hydraulic forces acting on the seal assembly 100 can vary directly with the fluid pressure delivered to the sprinkler body 14. The fluid pressures experienced by the sprinkler depend upon the installation environment of the sprinkler. For example, the hydraulic pressure in a fire protection system installation can range from 7-175 psi. to satisfy the operating pressures of the sprinkler. Under some circumstance, the fluid pressure delivered to the sprinkler can spike to a much greater pressure. For example, in a hydrostatic leak test installation, a sprinkler can be subjected to a hydrostatic pressure ranging from 500 psi. to 700 psi or more.

Accordingly, the glass bulb trigger 200 is subject to opposed compressive forces with one force applied by the load screw 300 at the first end 204 of the bulb 200 and the oppositely directed reactive, spring and hydraulic forces transmitted by the seating disc 102 at the second end 206 of the bulb 200. In preferred embodiments of the sprinkler assembly, the operational arrangements 50 are configured to define compressive forces acting on the glass bulb 200 so that the sprinkler 10 can satisfy a hydraulic pressure test and a subsequent thermal response bath test. Exemplary embodiments of the operational arrangement 50, provide a preferred axial flexibility in the arrangement. The preferred arrangements 50 have been shown to satisfy sequential hydrostatic and operational temperature testing performed in accordance with UL1767 using random sampling to a success rate not previously before believed to be available.

With reference to FIGS. 2 and 3, the various operating components of the sprinkler such as, for example, the glass bulb trigger 200 and seal assembly 100 are individually and collectively relatively configured with respect to one another to define the preferred operational arrangement 50. For example, in preferred embodiments of operational arrangement 50, the surface engagement between the operating components can be varied to define a preferred axial flexibility. Moreover, the individual components themselves can be configured to either stiffen or contribute to the axial flexibility of the arrangement 50. Generally, the glass bulb 200 is an elongate rigid member configured to withstand axial loads from 400-800 lbs. The seating disc 102 is also a rigid stiffing member constructed from steel. The shell cap 104 is a more pliable steel component with a material thickness much less than that of the seating disc 102. The pliability of these components can be altered by changing the material of the components or their geometry in order to alter the axial flexibility of the trigger and seal assembly arrangement 200, 100 overall, provided that the resulting arrangement can provide the desired sealing and thermal responsiveness described herein.

The sealing disc 106 is the most resilient member between the screw 300 and the sealing surface 19 that provides axial resiliency to the operational arrangement 50. As previously described, the sealing disc 106 preferably defines a non-linear spring rate in which the spring rate increases inversely with overall sealing disc height h. Accordingly, flexibility in the operational arrangement 50 can be controlled by minimizing the compression of the sealing disc 106 under the load of the compression screw 300 while compressing the sealing disc sufficiently to form a fluid tight sealed engagement for operational and testing purposes. In one preferred method of assembly, the sprinkler 10 can be assembled to set the sealing disc 106 to a fixed height. Alternatively, the sprinkler 10 can be assembled to compress the disc 106 to a fixed force or stress using an adjustment device as shown in German Patent Application Publication DE102004027568. Alternatively or additionally, the sealing disc 106 can be compressed for all operative and test conditions so that the sealing disc continues to flex along a defined portion of its spring curve.

To counter or limit the axial flexibility of the operational arrangement 50, the seating disc 102 and shell cap 104 provide stiffening elements to the arrangement 50. The resulting axial flexibility in the arrangement 50 define the compressive forces on the glass bulb trigger 100 which can impact the sealing and thermal operation of the arrangement 50. Accordingly, the magnitude of flex and stiffness in the operational arrangement 50 can be related to the relative overlap or coverage between the area defined by the outlet 18 normal to the sprinkler axis X-X, the sealing disc 106, the assembled shell cap 104 and/or the seating disc 102. Axial flexibility can be directly related to the coverage of the sealing disc 106 over the outlet 18 area. The more the resilient sealing disc 106 covers the outlet area, the greater the axial flexibility in the trigger and sealing arrangement 200, 100. In a preferred embodiment, the sealing disc 106 covers 10-33% of the outlet area defined by the outlet 18 with the shell cap 104 covering the remainder. Summarized in the table below are preferred outlet areas for a given nominal K-factor and the preferred percent coverage by the sealing disc 106 for the outlet area.

TABLE 3

| Nominal K-Factor (GPM/(psi)$^{1/2}$) [LPM/(bar)$^{1/2}$] | Outlet Area (sq. in) [sq. mm.] | Percent Coverage of Sealing Disc Over Outlet |
|---|---|---|
| 14.0 (200) | 0.391 (252.2) | 59% |
| 16.8 (240) | 0.468 (301.9) | 66% |
| 22.4 (320) | 0.614 (396.1) | 31.8% |
| 25.2 (360) | 0.694 (447.7) | 39.6% |
| 28.0 (400) | 0.765 (493.5) | 46% |

Conversely, the flexibility of the sealing disc 106 is inversely related to the overlap of the seating disc 102 over the second surface 106*b* of the sealing disc 106 and/or the coverage of the seating disc 102 over the outlet 18. Accordingly, the axial flexibility in the trigger and sealing assembly arrangement 200, 100 can be increased by decreasing the overlap of the seating disc 102 over the sealing disc 106. In a preferred arrangement, the seating disc 102 overlaps 50-75% of the annular surface 102*b* of the sealing disc 102.

The operational arrangement 50 can be alternatively or further defined by preferred relationships or ratios between the operating components of the arrangement 50. For example, the operational arrangement 50 can be defined by a preferred nominal K-factor of frame 12 to bulb trigger 200 diameter. In a preferred embodiment, a sprinkler frame body 14 defining a nominal K-factor being one of 25.2 or 28.0, a preferred glass bulb trigger diameter BD is less than 0.2 in. (5 mm) and more preferably 0.11 in. (3 mm). Other interrelationships between components can include a sealing disc 106 with a coverage of 10-33% over the area defined by the outlet 18 with the sealing disc 106 compressed to no more than 25% of its overall height. Another preferred ratio of the sprinkler assembly 10 can be defined by the internal diameter at the frame outlet D2-to-the internal diameter DD2 of the sealing disc 106 which preferably ranges from 1.5:1 to 1.1:1. In another preferred aspect, the operational arrangement 50 and its load screw 300 can define a preferred sprinkler assembly load of no more than 350 lbs. force, more preferably no more than 340 lbs. force, even more preferably no more than 330 lbs. of force and yet even more preferably no more than 315 lbs. force. Sprinkler assembly load, as used herein, is understood as it is in the art as being the extension force applied to the sprinkler frame by the assembly of the trigger and sealing assemblies 200, 100. Determination of assembly load can be made using known techniques, for example, by measuring the amount force required to axially displace the fluid deflection member 20 and return it to its original position after removal of the glass bulb trigger 200.

Preferred embodiments of the sprinkler assembly 10 with the preferred operational arrangement 50 satisfy sequential hydraulic and thermal response testing. Generally, preferred embodiments of the preferred sprinkler 10 having a preferred arrangement of components were hydrostatically leak tested to verify that the assembly could maintain a fluid tight seal when subjected to a test pressure of fluid of 500 psi. or more. Following successfully satisfying the hydrostatic test, the same sprinkler was subjected to an operational temperature test to verify that the sprinkler would thermally actuate at an operating test temperature that is within an acceptable range, preferably within 95% or more, of its nominal temperature rating when placed in a heated environment. When repeatedly successful through sample testing, it can be determined that the configuration of components defined the preferred operational arrangement 50 for the sprinkler 10. Preferred embodiments of the sprinkler 10 more preferably thermally actuate at a temperature within 95%-105% of the nominal temperature rating and even more preferably actuate at a temperature within 98%-102% of the nominal temperature rating.

In one preferred method of evaluating the preferred sprinkler 10, fifteen (15) or more, preferably twenty (20) or even more preferably one hundred (100) test samples of the preferred sprinkler assembly 10 are provided and subjected to a hydrostatic strength test performed in accordance with UL1767. In the hydrostatic test, each of the test sprinklers are filled at their inlet 16 with water and vented of air. The delivered water pressure is increased from zero psig. to seven hundred psig. (0 to 700 psig. [0 to 4.8 MPa]) at a rate not exceeding 300 psig (2.07 MPa) per minute. The fluid pressure is maintained at 700 psig. and held for one minute (1 min.). In satisfying the hydrostatic test, fewer than 25% of the test sprinklers and more preferably none of test sprinklers ruptured, operated or released either the glass bulb 200 or the seal assembly 100 during the pressure increase or when being maintained at 700 psig. for one minute.

Following the hydrostatic testing and within a preferred period of 0 days to seven (7) days of the hydrostatic testing, the test sprinklers that successfully performed in the hydraulic testing were subjected to thermal operational testing. The test sprinklers are tested in a water or oil bath in an upright orientation. The bath is provided with a heat source to heat the liquid at a reasonable or "convenient" rate until the liquid is within 20° F. (11° C.) of the operating temperature rating of the device. The temperature is then increased at a rate not exceeding 1° F. (0.5° C.) per minute until operation of the sprinkler or until a temperature 20° F. (11° C.) above the operating temperature rating of the device. The temperature of the liquid bath and time at sprinkler operation is recorded for each test sprinkler. In satisfying the bath test, over 95% and even more preferably 100% of the test sprinklers operated within at least 95% of its nominal temperature rating of the sprinkler. Alternatively or additionally, the test sprinklers operated within +3.5 percent of the nominal temperature rating of the sprinkler. It is believed that there is no known ESFR sprinkler with a glass bulb trigger and nominal K-factor of K14 or greater that would have as a high a success rate in such sequential testing.

The preferred configuration of components and sequential testing provide preferred methods of verifying and providing operational arrangements for incorporation into a preferred sprinkler platform; and in particular, for incorporation into a suppression mode sprinkler platform. In a preferred aspect, with the preferred sequential testing demonstrating that the configuration of components defined a preferred operational arrangement 50, the arrangement 50 can be appropriately incorporated into a sprinkler assembly platform and replicated. In another preferred aspect, the configuration of components and sequential testing provide a preferred method of fire protection that includes obtaining a sprinkler assembly with the preferred operational arrangement; and providing the sprinkler for fast response protection. Obtaining the preferred sprinkler assembly can include configuring, replicating, manufacturing, acquiring, purchasing and/or testing the sprinkler for the preferred operational arrangement. Providing the preferred sprinkler can include specifying, transferring, selling, conveying and/or installing the sprinkler for installation to provide the preferred sprinkler assembly.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A method of providing an operational arrangement for a quick response or fast response fire protection sprinkler, the sprinkler having a nominal K-factor of at least 14 gpm/(psi)$^{1/2}$ and a nominal temperature rating, the method comprising:

providing a configuration of components that includes a frame and glass bulb trigger that forms a fluid tight seal in an outlet of the frame with a sealing assembly; and verifying that the configuration of components defines an operational arrangement, the verifying including:

testing the configuration of components to withstand an internal fluid test pressure of 500 psig; and subsequently testing the configuration of components in a thermal response bath test for operation at a temperature that is within ±3.5 percent of the nominal temperature rating.

2. The method of claim 1, wherein the providing the configuration of components further comprises coupling a fluid deflection member to the frame to define a pendent or an upright sprinkler.

3. The method of claim 2, wherein testing the configuration of components in the thermal response bath test comprises providing the nominal temperature rating that ranges from 135° F.-300° F.

4. The method of claim 3, wherein the providing the configuration of components further comprises providing a body of the frame with the nominal K-factor being one of 25.2 or 28.0, and the glass bulb trigger with a bulb diameter of less than 5 mm.

5. A method of providing an operational arrangement for a quick response or fast response fire protection sprinkler, the sprinkler having a nominal K-factor of at least 14 gpm/(psi)$^{1/2}$ and a nominal temperature rating, the method comprising:

providing a configuration of components that includes a frame and thermally responsive trigger that forms a fluid tight seal in an outlet of the frame with a sealing assembly; and verifying that the configuration of components defines an operational arrangement, the verifying including:

testing the configuration of components to withstand an internal fluid test pressure of 500 psig; and subsequently testing the configuration of components in a thermal response bath test for operation at a temperature that is within ±3.5 percent of the nominal temperature rating.

6. The method of claim 5, wherein the providing the configuration of components further comprises coupling a fluid deflection member to the frame to define a pendent or an upright sprinkler.

7. The method of claim 6, wherein testing the configuration of components in the thermal response bath test comprises providing the nominal temperature rating that ranges from 135° F.-300° F.

8. The method of claim 7, wherein the providing the configuration of components further comprises providing a body of the frame with the nominal K-factor being one of 25.2 or 28.0, and the thermally responsive trigger comprises a glass bulb trigger with a bulb diameter of less than 5 mm.

* * * * *